June 24, 1969 P. E. ROY 3,451,729
TRACTION BELT FOR LOW HORSEPOWER SNOW VEHICLES
Filed Dec. 6, 1966
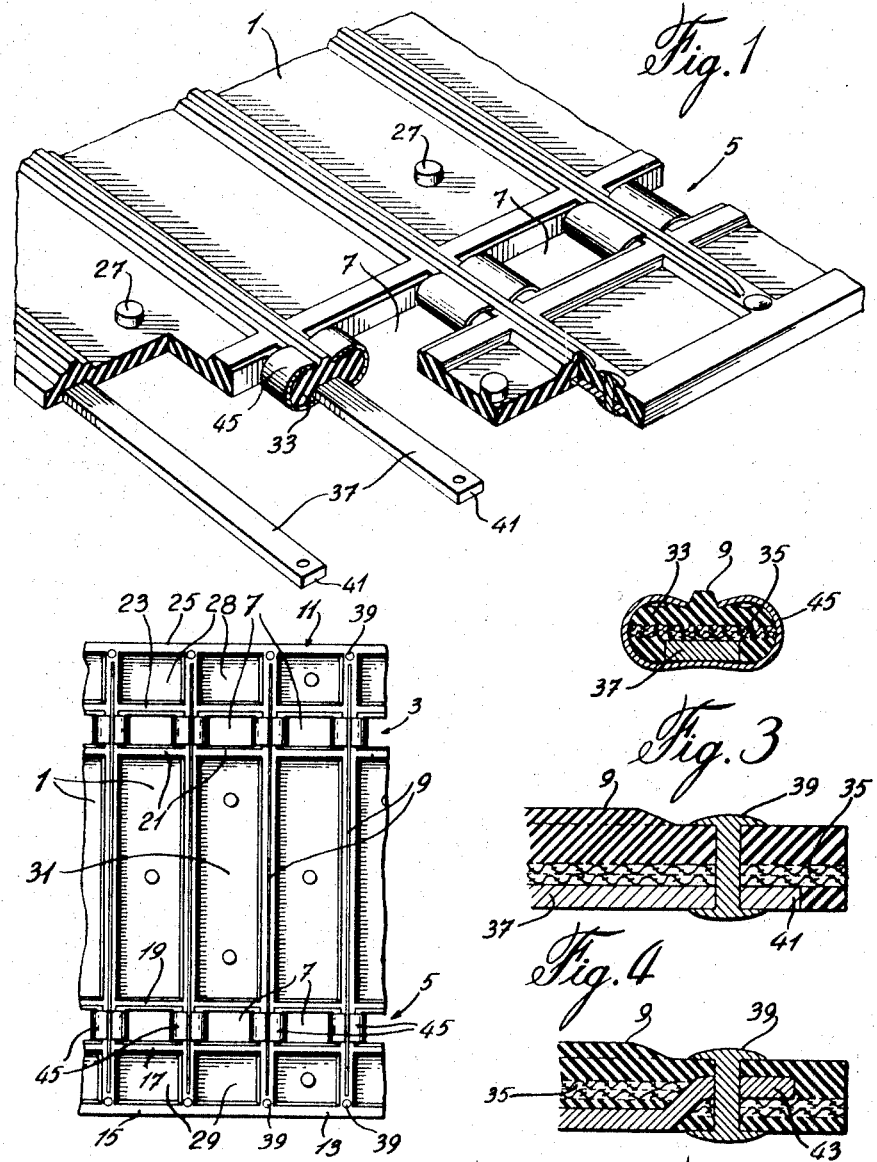
INVENTOR
Paul E. ROY
BY
Raymond A. Robic
ATTORNEY

United States Patent Office 3,451,729
Patented June 24, 1969

3,451,729
TRACTION BELT FOR LOW HORSEPOWER SNOW VEHICLES
Paul E. Roy, Thetford Mines, Quebec, Canada, assignor to Les Industries de Fibre de Verre de Thetford Inc., Thetford Mines, Quebec, Canada
Filed Dec. 6, 1966, Ser. No. 599,463
Int. Cl. B62d 55/24
U.S. Cl. 305—38    4 Claims

ABSTRACT OF THE DISCLOSURE

A traction belt adapted to run over the sprocket wheels of a small snow vehicle. It has two longitudinal rows of tooth apertures. The inner face has thin metallic blades transversely embedded in the material of the traction belt between each row of tooth apertures. Finally the outer face of the traction belt has gripping tracks and studs for providing good traction on a snow covered surface.

---

The invention relates to an endless track or traction belt particularly intended for use on small snow vehicles of the type generally and variously referred to under a series of trademark names such as: "Skidoo's," "Snow Cruisers" and the like.

Tracks of the same type are commonly made of rubber and are power driven by means of a series of sprocket wheels. Commonly also, across the transverse distance between the sprocket vehicles' positions, stiffeners are used in the belts, such stiffeners being usually in the form of transversely disposed stiff metal rods embedded in the rubber belts and spaced apart by a distance equivalent to the interval between consecutive teeth of the sprockets or a small multiple thereof.

Whereas the metallic inserts or rods play an essential role in maintaining a flat running and bearing surface for the vehicle, it is found that such rods, due to their position inside the rubber of the belt, are responsible for the relatively short useful life of the belt; the rods induce high stresses in the adjacent rubber and are therefore responsible for an abnormally high rate of fatigue.

Also contributing to the early failures of such belts of the prior art, is the fact that the fabric reinforcing mats or plies which are used in the construction of the belts are usually disposed on a plane half-way between the two surfaces of the belt.

In order to overcome the above disadvantage, I have provided an endless traction belt for snow vehicles, said traction belt being adapted to run over a plurality of sprocket wheels by means of at least two rows of tooth apertures provided therein. The traction belt has thin metallic blades fixedly mounted on the inner face of the endless belt between each of the tooth apertures to maintain a flat running and bearing surface for the snow vehicles. The blades are embedded on the inner face of the traction belt to define therewith a flat surface. The other face of the belt is provided with gripping means integral with the material of said belt.

In a further embodiment according to the invention, the reinforcing layers of fabric are located as close as possible to the inner face of the belt and preferably therein at a level immediately above the top surface of the aforementioned metal strips.

In the drawings which illustrate embodiments according to the invention.

FIGURE 1 is a perspective view, partly cut out, of a portion of the traction belt according to the invention;

FIGURE 2 is a top plan view of a section of the traction belt according to the invention;

FIGURE 3 is a cross-section view illustrated that portion of the endless traction belt between two adjacent tooth apertures;

FIGURE 4 is a side elevation view illustrating the attachment of the end portion of a blade of spring steel to the traction belt; and FIGURE 5 is a view similar to FIGURE 4, but illustrating an end portion upwardly projecting and overlying the marginal portion of the fabric.

The traction belt 1 according to the invention comprises two longitudinal rows 3 and 5 of rectangularly shaped tooth apertures 7 adapted to receive the teeth of sprocket wheels (not shown) mounted on the snow vehicles. The traction belt 1 comprises a plurality of transverse gripping tracks 9 which are parallel to one another and are located between each of said tooth apertures 7. It will be understood that the gripping tracks 9 extend from one marginal portion 11 of the traction belt 1 to the other marginal portion 13. Across from said gripping track 9, and perpendicularly therewith there are six reinforcing and gripping tracks 15, 17, 19, 21, 23, and 25. It will be appreciated that these six longitudinal tracks though having some gripping function also have the specific property of reinforcing the edges of the rectangularly shaped tooth apertures 7 and of the marginal portions 11 and 13 of the traction belt. It will also be appreciated that the portions of gripping tracks 9 adjacent the rectangularly shaped tooth apertures 7 will also have a reinforcing function.

Within the rectangles defined by the gripping tracks 9 and the reinforcing and gripping tracks 15, 17, 19, 21, 23 and 25 there are a plurality of projecting studs 27 which will provide still further gripping traction on the endless traction belt 1.

The face of the traction belt 1 containing the above gripping tracks, gripping and reinforcing tracks and projecting studs will of course be the outer face of the traction belt 1. The traction belt 1 will therefore consists of three longitudinal portions: the outer portions 28 and 29 and the middle portion 31. The outer portions 28 and 29 will of course be separated from the inner portion by the two rows 3 and 5 of tooth apertures 7.

The middle portion 31 is connected to the outer portions 28 and 29 by means of the rubber bridging portions 33 which also separate the tooth apertures 7.

In order to remove as much as possible the elastic properties of the rubber material of the endless traction belt 1, provisions have been made for locating at least one reinforcing layer of fabric 35 (FIGURES 3, 4 and 5) as close as possible to the inner face of the belt and preferably therein at a level whereat it is clear of the metal blades which will be described hereinbelow. (FIGURES 4 and 5.) It will be easily realized then since the traction belt runs under appreciable tension, every time it passes around a sprocket wheel, the contraction produced on the inner portion of the rubber material of the belt will result in a high tension on the outer portion of the belt. By placing the fabric as close as possible to the inner face of the belt as in the present invention, the tension produced in the fabric will be smaller than when the fabric is situated midway between the outer and inner faces.

On the inner face of the endless traction belt 1 and opposite the gripping ribs 9 there are provided thin blades of spring steel or the like material 37 between each tooth apertures 7. The blades of spring steel or the like material 37 are positioned in the mold prior to the vulcanizing cure of the rubber composition of the endless traction belt 1 so as to ensure adhesive retention between the metal and the rubber. Where proper adhesive retention will be difficult to achieve because of some incompatibility of the metal and rubber composition combination, it has been found that good results may be achieved by previously coating the metal blades 37 with a more compatible rubber composition such as a synthetic resin and carrying out a partial cure thereof thereon. The thin blades of spring steel or the like material will be embedded on the inner face of the traction belt 1 to define therewith a flat surface (FIGURES 4 and 5). The thin blades of spring steel or the like material 37 are retained therein by means of rivets 39 at the end of each thin blade of spring steel.

Referring to FIGURE 4, it will be realized that the metal blades are terminated by means of an end portion 41 (FIGURE 1) formed therein and terminating short of the marginal portion of the fabric layer. A rivet 39 or other suitable securing means are used in conjunction with each end portion in order to ensure a more positive retention of the blade in the rubber material of the belt and thereby reduce the risk of any of the metal blades parting from the belt and being projected during operation.

In a preferred embodiment according to the invention, the thin blades of spring steel or the like material 37 are terminated by means of outwardly offset ends 43 (FIGURE 5) to project through the marginal portion of the fabric layer and to flatly overlie the said marginal portion or edge of the fabric.

The rubber bonds 33 of the endless traction belt 1 separating two tooth apertures 7 are further reinforced by means of wear clips 45 and are illustrated in FIGURES 1 and 3. It is obvious that these wear clips 45 may be solid with the material of the thin blades of spring steel to provide still better retention of the blades on the inner face of the traction belt.

Although specific embodiments of this invention have just been described, it will be understood that various modifications are permissible within the spirit of the invention, the scope of which is to be determined from the appended claims only.

I claim:

1. A rubber traction blade belt for use in tension between a number of spaced apart sets of several coaxially spaced apart and disposed sprocket wheels of a snow vehicle; said belt presenting longitudinally extending rows of sprocket tooth apertures separated by a rubber bridging portion, said aperture and bridging portion between them in each row being in normal transverse alignment with the apertures and bridging portion respectively of any other row; the provision of thin resilient metal blades embedded in said rubber blade at the inner surface thereof; said blades extending across said belt normally to the marginal edges thereof and passing centrally through the rubber bridging portion; said belt presenting a smooth inner surface in which one surface of the said blades is exposed; a metal wear clip wrapped around and protectively covering each bridging portion; each wear clip integrally connected to the corresponding metal blades.

2. A rubber traction belt as claimed in claim 1 wherein there is at least one layer of reinforced fabric disposed nearer to the inner surface than the outer surface thereof, and wherein each metal blade has at each end an outwardly offset portion projecting from one side to the other of the said reinforced fabric and overlying the same on the said other side.

3. An endless track for snow vehicle, said endless track being of the type each comprising a single continuous belt of rubber material, said continuous belt to wind around a pair of spaced apart sprocket wheels, said continuous belt comprises:

(a) two longitudinal rows of two apertures to respectively engage the teeth of the sprocket wheels;

(b) thin spring steel blades integrally mounted at and flush with the inner face of said continuous belt, each between two successive tooth apertures of each row and oriented in a direction which is transverse to the direction of travel of said snow vehicle to provide flat running and bearing surface for said snow vehicle;

(c) at least one layer of reinforced fabric located within said continuous belt at a level immediately overlying said blades;

(d) each of said blades having outwardly offset ends projecting through the marginal portion of the fabric layer to flatly overlie the outer surface of said margin portion of said fabric;

(e) rivets provided along the marginal edges of said continuous belt through said projecting ends of said blades, said fabric layers and the rubber material of said continuous belt to further anchor said blades to the rubber material; and (f) longitudinal and transversal ribs, and projecting studs provided on the outer face of said continuous blades for gripping into the snow.

4. An endless track for snow vehicle, said endless track being of the type which comprises a single continuous belt to wind around a plurality of sprocket wheels through provision therein of an equal plurality of rows of tooth apertures, said continuous belt having thin metal blades integrally mounted therein and flush with the inner surface thereof, each between two successive tooth apertures of each row and oriented in a direction which is transverse to the direction of travel of said snow vehicle to provide a flat running and bearing surface for said snow vehicle, each blade presenting outwardly offset end portions which project through the corresponding portion of the overlying fabric from one side to the other thereof, flatly overlie said fabric on said other side thereof and are secured thereto; the outer face of said continuous belt provided with gripping means integral with the material thereof.

References Cited

UNITED STATES PATENTS

| | | | |
|---|---|---|---|
| 263,566 | 8/1882 | Nixon | 305—38 |
| 2,449,421 | 9/1948 | Slemmons | 305—38 |
| 2,290,109 | 7/1942 | Mayne | 305—38 |
| 2,899,242 | 8/1959 | Bombardier | 305—38 |
| 3,011,576 | 12/1961 | Howes | 305—35 X |
| 3,282,630 | 11/1966 | Harrison | 305—38 |
| 3,285,677 | 11/1966 | Marier | 305—38 |

RICHARD J. JOHNSON, *Primary Examiner.*